Patented June 14, 1949

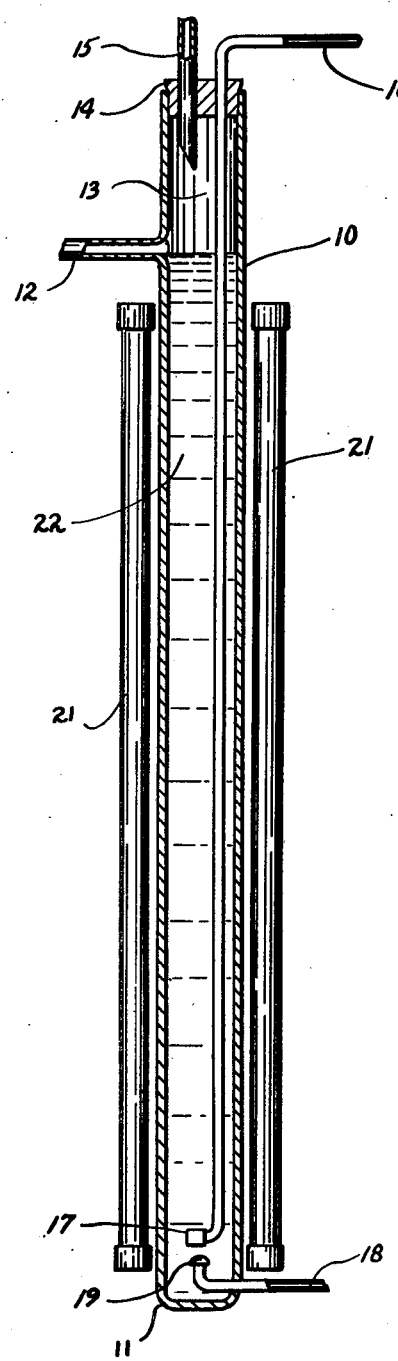

2,473,161

UNITED STATES PATENT OFFICE 2,473,161

PROPANE CHLORINATION

Earl T. McBee, La Fayette, Ind., and Lawrence W. Devaney, Fishkill, N. Y., assignors to Purdue Research Foundation, West Lafayette, Ind., a corporation of Indiana Application September 26, 1945, Serial No. 618,789

5 Claims. (Cl. 204—163)

This invention relates to a continuous process for the chlorination of a $C_3$ hydrocarbon, such as propane or propene, to produce polychloropropanes, and is particularly concerned with the production of a liquid, higher polychloropropane mixture.

The fact that propane and chlorine react, particularly in the presence of light, with explosive violence over a wide range of proportions has presented a major difficulty in processes involving the direct chlorination thereof. The obvious method of carrying out the reaction is, of course, to mix the chlorine and propane in proportions outside the explosive limits. This method is not commercially desirable, since it involves the repeated introduction of very small proportions of chlorine with sufficient time allowed between each successive introduction to permit reaction to occur. Even when this method is followed, burning often results due to high local concentrations of chlorine. Numerous other ways of carrying out the reaction have been suggested, such as causing the chlorine and propane to react in extremely narrow reaction chambers in close contact with cooled surfaces to provide efficient cooling of the reacting mixture, diluting the reactants with an inert gas, while mixing in the dark and thereafter reacting the materials in inert media, and various other ways. Generally speaking, those processes have not proven satisfactory in commercial practice, using propane as the starting material, and the higher polychlorinated propanes are prepared by chlorinating a lower chlorinated propane obtained by methods other than the direct chlorination of propane, such as the addition of chlorine to propene.

In certain instances, such as in chlorinolysis reactions involving the production of hexachloroethane, tetrachloroethylene, and carbon tetrachloride, a uniformly highly chlorinated, liquid propane is desired having a high specific gravity, i. e., a specific gravity greater than about 1.5, preferably greater than about 1.65, and substantially free of chlorinated propanes having a density less than about 1.5. Such polychloropropane mixtures have heretofore best been prepared by the batch-wise chlorination of di- or tri-chloropropanes followed by distillation from the product of substances having an undesirably low proportion of chlorine. It is difficult in such batch-wise chlorination to continue the chlorination for a sufficiently long period to produce substantially only chloropropanes having a density above about 1.5 without at the same time chlorinating some of the substances present so far as to cause them to separate in solid form. Recycling of considerable amounts of distilled insufficiently chlorinated substances is also necessary, and the partially chlorinated propane used as starting material renders the process uneconomical. This is especially true in the preparation of polychloropropane mixtures having a density of from about 1.65 to about 1.75 which are particularly desirable for use in chlorinolysis reactions. Other disadvantages of such batch-wise chlorination are apparent. Insofar as we are aware, no satisfactory commercial process has been devised which can be operated in continuous manner for the preparation of liquid polychloropropane mixtures having a specific gravity greater than about 1.5 by the direct chlorination of propane.

It is, therefore, an object of the present invention to provide a continuous process for the production of polychloropropane mixtures having a desired specific gravity above about 1.5. An additional object is to provide a continuous process for the direct chlorination of propane to produce a polychloropropane mixture having a desired specific gravity above 1.5. Still an additional object is to provide a continuous process for the production, by the direct chlorination of propane, of a polychloropropane mixture siutable for use in chlorinolysis reactions. A further object is to provide a continuous rocess for the production of polychloropropane mixtures by the chlorination of propane without danger of burning or of the formation of colored reaction products.

We have now found that the chlorination of propane can be carried out rapidly and economically, and with the production of a mixture of higher polychloropropanes having a specific gravity above about 1.5, by providing an irradiated body of liquid polychloropropanes having substantially the specific gravity of the product desired, and by introducing gaseous propane and gaseous chlorine continuously and simultaneously, and at separate points substantially removed from one another, into the body of mixed chloropropanes, maintained at a temperature not to exceed substantially about 90 degrees centigrade preferably while causing liquid polychloropropane from the region around the point of introduction of propane to flow or move away from such region and into the region around the point of introduction of chlorine. In this way the gaseous propane which is first introduced into the moving body of polychloropropanes becomes dispersed therein and the resulting mixture then moves into the region around the chlorine inlet where the propane reacts rapidly and smoothly with chlorine. It is possible also to introduce the chlorine into the moving body of polychloropropanes to produce a dispersion thereof and then to bring this dispersion into contact with the propane dispersion by locating the chlorine inlet below the propane inlet, and, while this is not our preferred mode of operation, it is included within the scope of our claims.

Polychloropropane product having the desired specific gravity is withdrawn continuously from the body of liquid polychloropropane mixture and in this way the volume of the mixture of polychloropropanes in the reaction vessel is kept substantially constant. Hydrogen chloride and, usually, a small proportion of unreacted propane are evolved from the liquid in gaseous form and may be conducted away and utilized or disposed of in any way desired.

The reaction is catalyzed by exposing the body of polychloropropane to the action of light, preferably of light having a wave length from about 2000 to 5000 A., and particularly between about 3000 to about 4000 A. Catalysts other than light are not employed and are preferably excluded from the reaction zone since they tend to promote the formation of color within the body of he liquid and thus to decrease the effectiveness of the catalytic light. Under optimum conditions, the reaction appears to be substantially complete within a very short time, the actual reaction time being thought to depend largely upon the length of time required for uniform contacting of the chlorine with the propane in the region immediately around the point of chlorine introduction.

The polychloropropane product obtained is water-white in color, has a substantially constant density, and contains only small proportions of dissolved propane and hydrogen chloride. The product is suitable without further treatment for use directly in applications where small proportions of these substances are not disadvantageous, such as in chlorinolysis reactions to produce hexachloroethane, tetrachloroethylene, and carbon tetrachloride. If desired, the product may be washed with water to remove hydrogen chloride and then heated to remove traces of unreacted propane and any other low boiling substances which may be present.

Although it might be expected that the process described would be applicable to the production under ordinary conditions of polychloropropane mixtures having a density less than about 1.5, this is not the case. The density of the product up to about 1.5 is substantially independent of the ratio of chlorine to propane. The ratio of the amount of chlorine to the amount of propane introduced into the reaction zone is not especially critical. It is unexpected that the density of the product produced by our process does not correspond to the density of the product which would be obtained by reacting all of the propane with all of the chlorine introduced.

From about 2 to about 7 moles of chlorine is preferably used in the process for each mole of propane. When less than about two moles of chlorine is used for each mole of propane, the loss of the propane in the form of unreacted material becomes excessive and the reaction does not proceed as smoothly as is desirable. The reaction is conveniently carried out at atmospheric pressure although pressures higher or lower than atmospheric may be employed if desired. When it is desired to produce a polychloropropane mixture having a specific gravity above about 1.70, the use of pressure is advantageous. Thus, a specific gravity of 1.86 may be obtained by increasing the pressure to about 50 pounds per square inch gauge.

The temperature of the body of polychloropropanes wherein the reaction is carried out is preferably maintained in the range between about 50 degrees and about 90 degrees centigrade, and we have found a temperature of about 60 degrees centigrade to be particularly desirable. We have found that a marked decrease in temperature results in a leveling off of the density of the product at about 1.30 when the process is carried out at a temperature of minus 40 degrees centigrade. This result is obtained independently of a constant rate of flow of chlorine and propane in fixed proportions which would, at temperatures more elevated, produce a material of higher specific gravity.

Movement of liquid within the reaction zone portion of the body of polychloropropanes from the region around the propane inlet to the region around the chlorine inlet may be accomplished in any convenient manner, such as by gentle agitation designed to cause a slow flow of liquid from the one region to the other without at the same time causing excessive agitation of the whole body of liquid. If desired, the propane and chlorine inlets may be situated in a conduit immersed in the body of liquid and a current of liquid caused to flow through the conduit, first past the propane inlet and then past the chlorine inlet. Preferably, however, the propane inlet is situated within the body of liquid directly below and substantially removed from the chlorine inlet. Thus, when propane is introduced into the liquid, the density of the mixture in the region around the propane inlet is lowered and the liquid therein rises into the region around the chlorine inlet where the major part of the reaction occurs. In this way there occurs a minimum of diffusion or circulation of reactants and partially reacted products out of the reaction zone and into the portion of the liquid mass from which the reaction product is being withdrawn.

Propane and chlorine are preferably delivered into the body of the liquid in finely divided form, e. g., through an alundum thimble to promote dispersion thereof. Any convenient source of light of the desired wave length may be used, such as conventional tubular mercury arc lamps.

Reference is made to the accompanying drawing which shows a centrally cross-sectioned view of a particular apparatus which may be employed in practicing the process of the present invention. An apparatus, substantially as shown herein, was successfully used in carrying out the examples therein.

The apparatus is comprised of an elongated glass chlorinator tube 10 which is closed at its lower end 11. The glass tube 10 is provided with an overflow pipe 12 which communicates between the chamber 13 and a collector not shown.

A stopper 14 is inserted into the open upper end of the chlorinator tube 10. A gas exhaust pipe 15, which extends into the tube chamber 13 through an appropriate opening in the stopper 14, is connected to a scrubber or other suitable recovery means, not shown. The lower end of the gas exhaust pipe 15 is positioned above the point where the overflow pipe 12 engages the tube 10.

A chlorine supply pipe 16, which is connected to a source of chlorine, not shown, passes through another appropriate opening in the stopper 14 and extends down within the chamber 13 to a point near the tube bottom 11. A fritted glass plate 17 is secured in conventional manner to the lower end of the chlorine supply pipe 16.

A propane supply pipe 18, which is connected to a source of propane, not shown, is received through a suitable opening in the chlorinator tube 10 near the bottom 11 thereof. The end of said propane supply pipe 18 within the tube chamber 13 preferably carries an alundum thimble 19 secured thereto in any convenient manner.

The overflow pipe, the gas exhaust pipe, the hydrocarbon supply pipe, and the chlorine supply pipe may be glass tubes.

A bank of tungsten filament lamps 21, which extend substantially the entire length of the chlorinator tube 10, is positioned around and adjacent to said tube.

The chlorinator tube 10 is filled to the overflow pipe 12 with a liquid polychlorohydrocarbon 22 having a specific gravity of substantially that which is desired in the chlorinated product to be produced within the above-described apparatus. Chlorine and propane are introduced simultaneously and continuously into the chlorinator tube 10 through the supply pipes 16 and 18, respectively. The chlorine and propane are diffused as they pass through the fritted glass plate 17 and the alundum thimble 19, respectively, into the liquid body of polychlorohydrocarbon 22.

The hydrocarbon becomes dispersed in the polychlorohydrocarbon as it moves away from the region around the alundum thimble 19 and moves into the region around the fritted glass plate 17 for reaction with chlorine. The radiation from the tungsten lamps 21 catalyzes the reaction between the hydrocarbon and the chlorine.

The polychlorohydrocarbon mixture, resulting from the reaction and having the desired specific gravity, is withdrawn from the tube chamber 13 through the overflow tube 12, while vapors evolved during the process are conducted away from the tube chamber 13 through the exhaust pipe 15.

Certain advantages of the invention are apparent from the following examples which are given by way of illustration only and are not to be construed as limiting:

Example 1

In order to provide a starting body of reaction medium of the desired specific gravity, a quantity of 1,2-dichloropropane having a specific gravity of 1.15 was placed in a vertical 1¼ inch diameter Pyrex glass column closed at its lower end and having an overflow tube located about 30 inches from the closed end. About 690 grams of 1,2-dichloropropane was required to fill the reactor tube up to the overflow. Means was provided to collect liquid from the overflow tube and to conduct evolved vapors away from the top of the tube. Propane vapor was introduced into the body of liquid through an alundum thimble located near the bottom of the column and chlorine was introduced through a fritted glass plate located about one inch directly above the propane inlet. The rates of flow of chlorine and propane vapors were first regulated so that two volumes of chlorine were introduced into the reactor for each volume of propane. Four 200-watt clear glass tungsten filament lamps were placed around the lower portion of the reactor column to catalyze the reaction. The product overflowing from the column was collected in separate successive portions, the specific gravity of each portion determined and the process continued until the specific gravity of successive portions was substantially constant.

In the accompanying Table 1 there are given the specific gravities of the portions collected, the time at which each was collected, and the amount of product in each portion. Volumes of chlorine and propane were measured at room temperature.

Table 1

$$\frac{\text{Vol. chlorine-2}}{\text{Vol. propane-2}}$$

| Time, hrs. | Portion No. | Sp. Gr. | Weight of Portion, gms. |
|---|---|---|---|
| 0 | 1 | (1.15) | ---------- |
| 2 | 2 | 1.219 | 212 |
| 10 | 3 | 1.434 | 327 |
| 15 | 4 | 1.470 | 282 |
| 20 | 5 | 1.507 | 279 |
| 25 | 6 | 1.516 | 274 |
| 30 | 7 | 1.521 | 302 |

The determination just described was repeated several times using, respectively, 3, 4, 5, and 6 volumes of chlorine for each volume of propane. The data obtained are given in the accompanying respective Tables 2, 3, 4 and 5.

Table 2

$$\frac{\text{Vol. chlorine-3}}{\text{Vol. propane-1}}$$

| Time, hrs. | Portion No. | Sp. Gr. |
|---|---|---|
| 0 | 1 | (1.15) |
| 5 | 2 | 1.370 |
| 8 | 3 | 1.435 |
| 15 | 4 | 1.513 |
| 19 | 5 | 1.545 |
| 25 | 6 | 1.566 |
| 33 | 7 | 1.586 |
| 42 | 8 | 1.590 |
| 46 | 9 | 1.597 |
| 47.5 | 10 | 1.598 |
| 60 | 11 | 1.598 |

Table 3

$$\frac{\text{Vol. chlorine-4}}{\text{Vol. propane-1}}$$

| Time, hrs. | Portion No. | Sp. Gr. | Weight of Portion, gms. |
|---|---|---|---|
| 0 | 1 | (1.15) | ---------- |
| 2 | 2 | 1.247 | 111 |
| 10 | 3 | 1.469 | 262 |
| 15 | 4 | 1.534 | 248 |
| 20 | 5 | 1.571 | 280 |
| 25 | 6 | 1.588 | 296 |
| 30 | 7 | 1.601 | 296 |

Table 4

$$\frac{\text{Vol. chlorine-5}}{\text{Vol. propane-1}}$$

| Time, hrs. | Portion No. | Sp. Gr. | Weight of Portion, gms. |
|---|---|---|---|
| 0 | ------ | (1.15) | -------- |
| 6 | 1 | 1.365 | 79 |
| 18 | 2 | 1.577 | 238 |
| 24 | 3 | 1.613 | 253 |
| 36 | 4 | 1.646 | 274 |
| 42 | 5 | 1.652 | 314 |
| 54 | 6 | 1.665 | 296 |
| 57.5 | 7 | 1.672 | 167 |
| 66 | 8 | 1.687 | 385 |
| 76 | 9 | 1.691 | 425 |
| 86 | 10 | 1.692 | 460 |

Table 5

$$\frac{\text{Vol. chlorine-6}}{\text{Vol. propane-1}}$$

| Time, hrs. | Portion No. | Sp. Gr. | Weight of Portion, gms. |
|---|---|---|---|
| 0 | | (1.15) | |
| 5 | 1 | 1.359 | 60 |
| 14 | 2 | 1.581 | 347 |
| 23 | 3 | 1.639 | 399 |
| 35 | 4 | 1.701 | 587 |
| 45 | 5 | 1.716 | 479 |
| 56 | 6 | 1.727 | 603 |
| 67 | 7 | 1.733 | 594 |
| 81 | 8 | 1.738 | 710 |
| 93 | 9 | 1.739 | 640 |
| 106 | 10 | 1.737 | 660 |

EXAMPLE 2

The reactor described in Example 1 was filled to the overflow tube with polychloropropane having a specific gravity of 1.521. Propane and chlorine were introduced into the reactor at the respective rates of 20 liters and 40 liters per hour. The product which was collected from the overflow initially had a specific gravity of 1.521 and this remained substantially unchanged over a period of more than 30 hours. The product was water-white and entirely liquid at room temperature.

EXAMPLE 3

The reactor described above was inclosed in a safety box and filled to the overflow with a polychloropropane mixture having a specific gravity of 1.601. Chlorine and propane were introduced into the reactor in the ratio of five moles of chlorine per mole of propane. The pressure in the reactor was maintained at about 50 pounds per square inch gauge. The density of the product after about thirty hours of operation leveled off at 1.86 and remained substantially constant thereafter.

EXAMPLE 4

The reactor described in Example 1 was filled to the overflow tube with polychloropropane having a specific gravity of 1.601. Propane and chlorine were introduced into the reactor at the respective rates of 10 liters and 40 liters per hour. The specific gravity of the product collected from the overflow tube remained unchanged for more than 30 hours until the process was interrupted. The product was water-white and entirely liquid at room temperature.

EXAMPLE 5

The apparatus described in Example 1 was filled to the overflow tube with a mixture of polychloropropanes having a specific gravity of 1.692. Propane and chlorine were introduced at the rates of 6 and 30 liters per hour respectively. The process was continued for more than 80 hours, the rate of production of polychloropropane averaging about 46 grams per hour. The entire product collected had a specific gravity between 1.69 and 1.70 and was entirely liquid at 20 degrees centigrade. The product was used successfully in a subsequent chlorinolysis to produce hexachloroethane, tetrachloroethylene and carbon tetrachloride.

While a particular advantage of the process is that it can be applied to propane as the starting material, it can be applied with equal utility to any of the lower, partially chlorinated propanes, such as propyl chloride, di- or tri-chloropropanes, in the event that such materials be available at a cost more favorable than propane. This is illustrated by the use in Example 1 of 1,2-dichloropropane as a starting material, it being necessary only to substitute a lower partially chlorinated propane for propane in carrying out the example as described.

Reference is made to our copending applications Serial 618,788 and 636,267, filed September 26, 1945, and December 20, 1945, respectively, the former now abandoned, in which are respectively described a continuous process for the chlorination of butane to produce a highly chlorinated polychlorobutane mixture and a continuous process for the chlorination of aliphatic and alicyclic hydrocarbons to produce highly chlorinated aliphatic and alicyclic hydrocarbons. In the said applications, the stated subject matter is more particularly described and specifically claimed.

We claim:

1. The method which includes: (1) maintaining a body of liquid polychloropropanes (A) having a specific gravity greater than the starting material (B), said specific gravity of (A) being greater than about 1.3; (2) continuously introducing through diffusion means into said liquid body (A) at a point in a first region thereof, a starting material (B) selected from the group consisting of propanes and partially chlorinated propanes, said starting material (B) having a specific gravity less than about 1.3 and less than that of the body of liquid polychloropropanes (A) into which said starting material (B) is introduced; (3) introducing chlorine into a second region of said liquid body (A); (4) causing liquid polychloropropanes (A) containing dispersed starting material from the one region to move continuously into the other region in the liquid body (A); (5) catalysing the chlorination reaction with actinic light; (6) maintaining a temperature above about —40 degrees centigrade and below about 90 degrees centigrade in the reaction zone; (7) maintaining a chlorine to starting material (B) molar ratio between about 2 to 1 and about 7 to 1; and, (8) continuously withdrawing a liquid polychloropropane product (C) having a substantially constant specific gravity greater than about 1.3 and greater than that of the starting material (B) from an upper portion of the said body of liquid (A) at a point removed from said first and second regions.

2. The method which includes: (1) maintaining a body of liquid polychloropropanes (A) having a specific gravity greater than the starting material (B), said specific gravity of (A) being greater than about 1.3; (2) continuously introducing through diffusion means into said liquid body (A) at a point in a first region thereof, a starting material (B) selected from the group consisting of propanes and partially chlorinated propanes, said starting material (B) having a specific gravity less than about 1.3 and less than that of the body of liquid polychloropropanes (A) into which said starting material (B) is introduced; (3) introducing chlorine into a second region of said liquid body (A); (4) causing liquid polychloropropanes (A) containing dispersed starting material from the one region to move continuously into the other region in the liquid body (A); (5) catalysing the chlorination reaction with actinic light; (6) maintaining a temperature between about 50 degrees and about 90 degrees centigrade in the reaction zone; (7) maintaining a chlorine to starting material (B) molar ratio between about 2 to 1 and about 7 to 1; and, (8) continuously withdrawing a liquid polychloropropane product (C) having a substantially constant specific gravity greater than about 1.3 and greater than that of the said starting material (B) from an upper portion of the said body of liquid (A) at a point removed from said first and second regions.

3. The process as claimed in claim 2, wherein the body of liquid polychloropropanes (A) has a specific gravity greater than about 1.5; and wherein the liquid polychloropropane product (C) has a substantially constant specific gravity greater than about 1.5.

4. The process as claimed in claim 2, wherein the body of liquid polychloropropanes (A) has a specific gravity greater than about 1.5; wherein the liquid polychloropropane product (C) has a substantially constant specific gravity greater than about 1.5; and, wherein the reaction mixture is maintained at a pressure greater than atmospheric.

5. The process as claimed in claim 2, wherein the starting material (B) is propane.

EARL T. McBEE.
LAWRENCE W. DEVANEY.

REFERENCES CITED

The following references are of record in the file of this patent:

UNITED STATES PATENTS

| Number | Name | Date |
|---|---|---|
| 1,248,065 | Blanc | Nov. 27, 1917 |
| 1,379,367 | Sparre et al. | May 24, 1921 |
| 1,523,563 | Snelling | Jan. 20, 1925 |
| 1,954,438 | Britton et al. | Apr. 10, 1934 |
| 2,174,737 | Coleman | Oct. 3, 1939 |
| 2,200,255 | Bender | May 14, 1940 |
| 2,377,669 | Brown et al. | June 5, 1945 |

OTHER REFERENCES

Hass et al., Industrial and Engineering Chemistry, vol. 27 (1935), p. 1193.